Oct. 6, 1959 A. J. W. M. VAN OVERBEEK 2,907,895
TRANSISTOR TRIGGER CIRCUIT
Filed Sept. 8, 1955
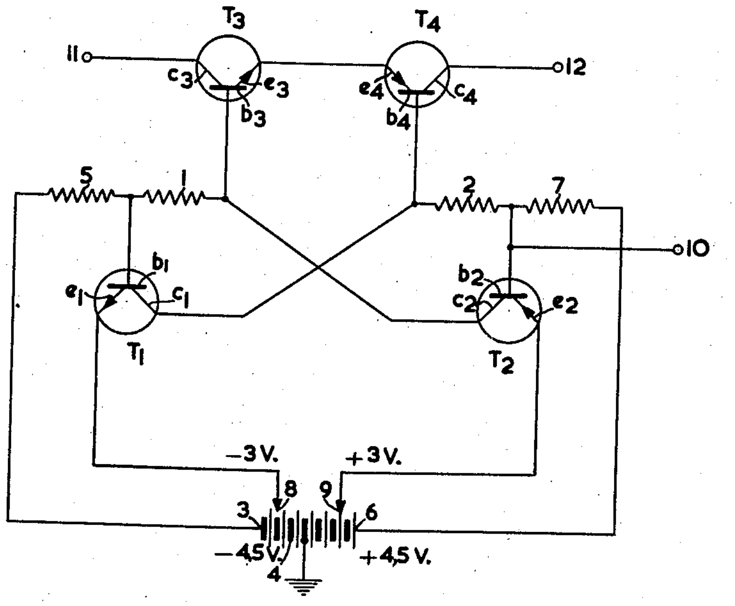
INVENTOR
Adrianus Johannes Wilhelmus Marie Van Overbeek
BY
AGENT United States Patent Office 2,907,895

Patented Oct. 6, 1959

2,907,895

TRANSISTOR TRIGGER CIRCUIT

Adrianus Johannes Wilhelmus Marie van Overbeek, Eindhoven, Netherlands, assignor, by mesne assignments, to North American Philips Company, Inc., New York, N.Y., a corporation of Delaware Application September 8, 1955, Serial No. 533,163

Claims priority, application Netherlands September 8, 1954

11 Claims. (Cl. 307—88.5)

This invention concerns transistor trigger circuits.

Transistor trigger circuits are known which comprise two transistors, of either PNP type or of NPN type, which may have two different electrically stable conditions; the first transistor being conducting and the second transistor being non-conductive, in one condition, and the first transistor being non-conducting and the second transistor being conducting, in the other condition. This type of circuit constantly consumes current due to the utilization of current-consuming potentiometers and due to the fact that one of the transistors is always conducting.

Also, a variable impedance circuit is known which utilizes a PNP and an NPN transistor, each having its base electrode connected to the collector electrode of the other; each being coupled through resistors to different terminals of a source of supply voltage which is connected in the reverse direction of the transistors. The terminals of the variable impedance circuit are the emitter electrodes of the transistor.

The transistor trigger circuit of the present invention comprises an NPN and a PNP transistor, each having its base electrode connected through a resistor to the collector electrode of the other. The base electrode of the NPN transistor is connected through a resistor to a first terminal of a source of supply voltage and the emitter electrode of this transistor is connected to a second terminal of the source of supply voltage. The emitter electrode of the PNP transistor is connected to a third terminal of the source of supply voltage and the base electrode of this transistor is connected through a resistor to a fourth terminal of the source of supply voltage. The potential at the terminals of the source of supply voltage form an increasing progression in the sequence listed; that is, they increase sequentially in value.

The transistor triggers circuit of the present invention may have two different electrically stable conditions, both transistors being conducting in one condition, and both transistors being non-conducting in the other condition. Since the circuit does not utilize current-consuming potentiometers, no-current flows in the system when both transistors are non-conducting. This is of particular importance in computers and automatic signalling systems, which are in one condition for comparatively short time periods and in the other condition for comparatively longer time periods. The circuit is particularly suitable for closing and interrupting a line over which alternating currents, such as, for example, voice currents, may be transmitted in either direction.

The principal object of this invention is the provision of a transistor trigger circuit of new and improved configuration.

An object of this invention is the provision of a new and improved circuit for closing and opening an alternating current line.

Another object of this invention is the provision of a new and improved transistor trigger circuit of high operating efficiency.

A further object of this invention is the provision of an improved trigger circuit particularly suited for use in a switching circuit.

The above and other objects of the invention will become apparent from a consideration of the following detailed description taken in connection with the accompanying drawing, in which the figure is schematic diagram of an embodiment of the circuit of the present invention.

The transistor trigger circuit comprises an NPN transistor $T_1$ comprising an emitter electrode $e_1$, a collector electrode $c_1$ and a base electrode $b_1$, and a PNP transistor $T_2$ comprising an emitter electrode $e_2$, a collector electrode $c_2$ and a base electrode $b_2$. The electrode $b_1$ is connected to the collector electrode $c_2$ through a resistor 1, and the base electrode $b_2$ is connected to the collector electrode $c_1$ through a resistor 2. The base electrode $b_1$ is connected to a first terminal 3, of a source of supply voltage 4, through a resistor 5, and the base electrode $b_2$ is connected to a fourth terminal 6, of the supply source 4, through a resistor 7. The emitter electrodes $e_1$ and $e_2$ are connected to a second terminal 8, of the supply source 4, and a third terminal 9 of the supply source 4, respectively. The first (3), second (8), third (9), and fourth (6) terminals of the supply source 4 may have potentials of —4.5 volts, —3 volts, +3 volts and +4.5 volts, respectively.

In the electrically stable condition, in which both transistors are non-conducting, the potentials of the collector electrode $c_1$ and the emitter electrode $e_1$ are +4.5 volts and —3 volts, respectively. Since the potential of the base electrode $b_1$ is —4.5 volts, the emitter electrode $e_1$ is positive relative to the base electrode $b_1$ and the transistor $T_1$ is non-conducting. The potentials of the collector electrode $c_2$ and the emitter electrode $e_2$ are —4.5 volts and +3 volts, respectively. Since the potential of the base electrode $b_2$ is +4.5 volts, the emitter electrode $e_2$ is negative relative to the base electrode $b_2$ and the transistor $T_2$ is non-conducting.

The trigger circuit shown in the figure is brought into the electrically stable condition, in which both transistors are conducting, by a control pulse supplied to an appropriate point 10 in the circuit such as a base electrode. The control pulse may be applied to a collector electrode, if desired. It may be assumed, for example, that a negative pulse is supplied to the base electrode $b_2$. In this case, the negative pulse in the base electrode $b_2$ causes said base electrode to become negative relative to the emitter electrode $e_2$. This produces a base current flow in the transistor $T_2$ and the collector electrode $c_2$ becomes conducting. Current then flows from the third terminal 9, of the supply source 4, through the emitter-collector path of the transistor $T_2$, and the resistors 1 and 5 to the first terminal 3, of said supply source. This causes the base electrode $b_1$ to become positive relative to the emitter electrode $e_1$. The transistor $T_1$ thus becomes conducting and current flows from the fourth terminal 6, of the supply source 4, through the resistors 7 and 2, and the collector-emitter path of the transistor $T_1$ to the second terminal 8, of said supply source. In this situation a voltage drop occurs across the resisor 7, causing the base electrode $b_2$ to assume a potential slightly less than that of the third terminal 9, of the supply source 4, for example, +2.9 volts, the circuit remains conductive. The potentials of the collector electrodes $c_1$ and $c_2$ may then become +2 volts and —2 volts, respectively.

The transistor trigger circuit of the present invention may be embodied in a switching circuit, as shown in the figure. The transistor switching circuit closes and opens a line (not shown) through which an alternating current flows and which is connected to terminals 11 and 12. The alternating currents may be voice currents or direct voltage signals utilized to control a relay in automatic telephone systems, which may be transmitted in either direction through the line.

The switching circuit comprises an NPN transistor $T_3$ comprising an emitter electrode $e_3$, a collector electrode $c_3$ and a base electrode $b_3$, and a PNP transistor $T_4$ comprising an emitter electrode $e_4$, a collector electrode $c_4$ and a base electrode $b_4$. The collector electrode $c_3$ is connected to the terminal 11 and the collector electrode $c_4$ is connected to the terminal 12. The emitter electrodes $e_3$ and $e_4$ are connected together. The base electrode $b_3$ of the transistor $T_3$ is connected to the collector electrode $c_2$ of the transistor $T_2$, and the base electrode $b_4$ of the transistor $T_4$ is connected to the collector electrode $c_1$ of the transistor $T_1$.

If the trigger circuit is in the electrically stable condition, in which both transistors $T_1$ and $T_2$ are non-conducting, the potentials of the base electrodes $b_3$ and $b_4$ are $-4.5$ volts and $+4.5$ volts, respectively. Since the emitter electrode $e_3$ is positive relative to the base electrode $b_3$, and since the emitter electrode $e_4$ is negative relative to the base electrode $b_4$, the transistors $T_3$ and $T_4$ are non-conducting. In this case, the switching circuit is open (without current) and cannot pass signals.

If the trigger circuit is brought into the electrically stable condition, in which both transistors $T_1$ and $T_2$ are conducting, the potential of the base electrode $b_3$ increases, due to the voltage drop across the resistors 5 and 1, and the potential of the base electrode $b_4$ decreases due to the voltage drop across the resistors 7 and 2. This causes the transistors $T_3$ and $T_4$ to become conducting, since the emitter electrode $e_3$ is negative relative to the base electrode $b_3$, and since the emitter electrode $e_4$ is positive relative to the base electrode $b_4$. The emitter-collector paths of the transistors $T_3$ and $T_4$ are then conducting and can pass signals from the terminal 11 to the terminal 12, or from the terminal 12 to the terminal 11. The potentials of the base electrodes $b_3$ and $b_4$ may then be $+0.1$ volt and $-0.1$ volt, respectively.

The transistors $T_3$ and $T_4$, of the switching circuit, may be interchanged. If the transistors $T_3$ and $T_4$ are interchanged, if the trigger circuit is in its non-conducting condition, the transistors $T_3$ and $T_4$ are in conducting condition and the switching circuit is closed. If the trigger circuit is in its conducting condition, the transistors $T_3$ and $T_4$ are in non-conducting condition and the switching circuit is open, since the base electrodes $b_3$ and $b_4$ are biased in non-conducting direction by the collector electrodes $c_2$ and $c_1$.

The switching circuit in which the transistors $T_3$ and $T_4$ are interchanged has an advantage of greater damping, when it is open, or non-conducting, than that of the switching circuit shown in the figure. If the transistors $T_3$ and $T_4$ are non-conducting there is still sufficient capacitative coupling between their own electrodes to permit some line transmission. In the interchanged circuit, however, the collector-emitter paths of the transistors $T_1$ and $T_2$ have a low internal resistance when said transistors are in conducting condition, so that the base electrodes $b_3$ and $b_4$ of the transistors $T_3$ and $T_4$ are effectively connected through said paths to points of constant potential, and the line transmission is reduced.

It is to be understood that the invention is not limited to the details disclosed but includes all such variations and modifications as fall within the spirit of the invention and the scope of the appended claims.

What is claimed is:

1. A transistor trigger circuit comprising a junction transistor of NPN type, a junction transistor of PNP type, each of said transistors having an emitter electrode, a collector electrode and a base electrode, means for connecting the base electrode of each of said transistors to another electrode of the other transistor, means for biasing both said transistors in normally non-conducting condition comprising a source of supply voltage having four terminals of sequentially increasing potential values, means for connecting the base electrode of one of said transistors to the first of said supply terminals, means for connecting the remaining electrode of said one of said transistors to the second of said supply source terminals, means for connecting the remaining electrode of the other of said transistors to the third of said supply source terminals and means for connecting the base electrode of said other of said transistors to the fourth of said supply source terminals, and means for applying a control pulse to the base electrode of one of said transistors thereby to bias both transistors to conducting condition in accordance with the magnitude and polarity of said control pulse.

2. A transistor trigger circuit comprising a junction transistor of NPN type, a junction transistor of PNP type, each of said transistors having an emitter electrode, a collector electrode and a base electrode, means for connecting the base electrode of each of said transistors to the collector electrode of the other transistor, a source of supply voltage having four terminals of sequentially increasing potential values, means for connecting the base electrode of said NPN transistor to the first of said supply source terminals, means for connecting the emitter electrode of said NPN transistor to the second of said supply source terminals, means for connecting the emitter electrode of said PNP transistor to the third of said supply source terminals, means for connecting the base electrode of said PNP transistor to the fourth of said supply source terminals, and means for applying a control pulse to the base electrode of said PNP transistor.

3. A transistor trigger circuit comprising a junction transistor of NPN type, a junction transistor of PNP type, each of said transistors having an emitter electrode, a collector electrode and a base electrode, a first resistor, first circuit means providing a direct current connection between the base electrode of said NPN transistor to the collector electrode of said PNP transistor through said first resistor, a second resistor, second circuit means providing a direct current connection between the base electrode of said PNP transistor to the collector electrode of said NPN transistor through said second resistor, said first and second circuit means comprising the sole connections between said base and collector electrodes, respectively, means for biasing both junctions of each of said transistors in normally non-conducting condition, and means for biasing both said transistors to conducting condition comprising means for applying a control pulse to the base electrode of said PNP transistor.

4. A transistor trigger circuit comprising a junction transistor of NPN type, a junction transistor of PNP type, each of said transistors having an emitter electrode, a collector electrode and a base electrode, a first resistor, means for connecting the base electrode of said NPN transistor to the collector electrode of said PNP transistor through said first resistor, a second resistor, means for connecting the base electrode of said PNP transistor to the collector electrode of said NPN transistor through said second resistor, a source of supply voltage having four terminals of sequentially increasing potential values, a third resistor, means for connecting the base electrode of said NPN transistor to the first of said supply source terminals through said third resistor, means for connecting the emitter electrode of said NPN transistor to the second of said supply source terminals, means for connecting the emitter electrode of said NPN transistor to the third of said supply source terminals, a fourth resistor, means for connecting the base electrode of said PNP transistor to the fourth of said supply source terminals through said fourth resistor, and means for applying a control pulse to the base electrode of said PNP transistor.

5. A transistor switching circuit for closing and opening an alternating current line comprising a first junction transistor of NPN type, a second junction transistor of PNP type, a third junction transistor and a fourth junction transistor, each of said transistors having an emitter electrode, a collector electrode and a base electrode, means for connecting the base electrode of said first transistor to the collector electrode of said second transistor, means for connecting the base electrode of said second transistor to the collector electrode of said first transistor, means for biasing both said first and said second transistors in normally non-conducting condition, means for applying a control pulse to the base electrode of said second transistor thereby to bias both said first and said second transistors to conducting condition in accordance with the magnitude and polarity of said control pulse, means for connecting the collector electrode of said second transistor to the base electrode of said third transistor, means for connecting the collector electrode of said first transistor to the base electrode of said fourth transistor, means for interconnecting the emitter electrodes of said third and fourth transistors, and means for connecting the collector electrodes of said third and fourth transistors in series with said line.

6. A transistor switching circuit for closing and opening an alternating current line comprising a first junction transistor of NPN type, a second junction transistor of PNP type, a third junction transistor and a fourth junction transistor, each of said transistors having an emitter electrode, a collector electrode and a base electrode, means for connecting the base electrode of said first transistor to the collector electrode of said second transistor, means for connecting the base electrode of said second transistor to the collector electrode of said first transistor, a source of supply voltage having four terminals of sequentially increasing potential values, means for connecting the base electrode of said first transistor to the first of said supply source terminals, means for connecting the emitter electrode of said first transistor to the second of said supply source terminals, means for connecting the emitter electrode of said second transistor to the third of said supply source terminals, means for connecting the base electrode of said second transistor to the fourth of said supply source terminals, means for applying a control pulse to the base electrode of said second transistor, means for connecting the collector electrode of said second transistor to the base electrode of said third transistor, means for connecting the collector electrode of said first transistor to the base electrode of said fourth transistor, means for interconnecting the emitter electrodes of said third and fourth transistors, and means for connecting the collector electrodes of said third and fourth transistors in series with said line.

7. A transistor switching current for closing and opening an alternating current line comprising a first junction transistor of NPN type, a second junction transistor of PNP type, a third junction transistor of NPN type, a fourth junction transistor of PNP type, each of said transistors having an emitter electrode, a collector electrode and a base electrode, a first resistor, means for connecting the base electrode of said first transistor to the collector electrode of said second transistor through said first resistor, a second resistor, means for connecting the base electrode of said second transistor to the collector electrode of said first transistor through said second transistor, means for biasing both said first and said second transistors in normally non-conducting condition, means for biasing both said first and said second transistor to conducting condition comprising means for applying a control pulse to the base electrode of said second transistor, means for connecting the collector electrode of said second transistor to the base electrode of said third transistor, means for connecting the collector electrode of said first transistor to the base electrode of said fourth transistor, means for interconnecting the emitter electrodes of said third and fourth transistors, and means for connecting the collector electrodes of said third and fourth transistors in series with said line.

8. A transistor switching circuit for closing and opening an alternating current line comprising a first junction transistor of NPN type, a second junction transistor of PNP type, a third junction transistor of NPN type, a fourth junction transistor of PNP type, each of said transistors having an emitter electrode, a collector electrode and a base electrode, a first resistor, means for connecting the base electrode of said first transistor to the collector electrode of said second transistor through said first resistor, a second resistor, means for connecting the base electrode of said second transistor to the collector electrode of said first transistor through said second resistor, a source of supply voltage having four terminals of sequentially increasing potential values, a third resistor, means for connecting the base electrode of said first transistor to the first of said supply source terminals through said third resistor, means for connecting the emitter electrode of said first transistor to the second of said supply source terminals, means for connecting the emitter electrode of said second transistor to the third of said supply source terminals, a fourth resistor, means for connecting the base electrode of said second transistor to the fourth of said supply source terminals through said fourth resistor, means for applying a control pulse to the base electrode of said second transistor, means for connecting the collector electrode of said second transistor to the base electrode of said third transistor, means for connecting the collector electrode of said first transistor to the base electrode of said fourth transistor, means for interconnecting the emitter electrodes of said third and fourth transistors, and means for connecting the collector electrodes of said third and fourth transistors in series with said line.

9. A transistor trigger circuit comprising a junction transistor of NPN type, a junction transistor of PNP type, each of said transistors having an emitter electrode, a collector electrode and a base electrode, a first resistor, means for connecting the base electrode of said NPN transistor to the collector electrode of said PNP transistor through said first resistor, a second resistor, means for connecting the base electrode of said PNP transistor to the collector electrode of said NPN transistor through said second resistor, a source of supply voltage having four terminals of sequentially increasing potential values, a third resistor, means for connecting the base electrode of said NPN transistor to the first of said supply source terminals through said third resistor whereby the bias potential for the collector electrode of said PNP transistor is supplied through the said first and third resistors, means for connecting the emitter electrode of said NPN transistor to the second of said supply source terminals, means for connecting the emiter electrode of said PNP transistor to the third of said supply source terminals, a fourth resistor, means for connecting the base electrode of said PNP transistor to the fourth of said supply source terminals through said fourth resistor whereby the bias potential for the collector electrode of said NPN transistor is supplied through the said second and fourth resistors thereby blocking both said transistors in one stable state of said circuit, and means for applying a control pulse to the base electrode of one of said transistors.

10. A transistor switching circuit for closing and opening an alternating current line comprising a first junction transistor of NPN type, a second junction transistor of PNP type, each of said transistors having an emitter electrode, a collector electrode and a base electrode, a third junction transistor and a fourth junction transistor, each of said third and fourth transistors having an internal emitter-collector path and a base electrode, means for connecting the base electrode of said first transistor to the collector electrode of said second transistor, means for connecting the base electrode of said second transistor to the collector electrode of said first transistor, means for biasing both said first and said second transistors in normally non-conducting condition, means for applying a control pulse to the base electrode of one of said first and second transistors thereby to bias both said first and said second transistors to conducting condition in accordance with the magnitude and polarity of said control pulse, means for connecting the collector electrode of said second transistor to the base electrode of said third transistor, means for connecting the collector electrode of said first transistor to the base electrode of said fourth transistor, and means for interconnecting the emitter-collector paths of said third and fourth transistors in series with each other and in series with said line.

11. A transistor switching circuit for closing and opening an alternating current line comprising a first junction transistor of NPN type, a second junction transistor of PNP type, a third junction transistor and a fourth junction transistor, each of said transistors having an emitter electrode, a collector electrode and a base electrode, means for connecting the base electrode of said first transistor to the collector electrode of said second transistor, means for connecting the base electrode of said second transistor to the collector electrode of said first transistor, means for biasing both said first and said second transistors in normally non-conducting condition, means for applying a control pulse to the base electrode of one of said first and second transistors thereby to bias both said first and said second transistors to conducting condition in accordance with the magnitude and polarity of said control pulse, means for connecting the collector electrode of said second transistor to the base electrode of said third transistor, means for connecting the collector electrode of said first transistor to the base electrode of said fourth transistor, means for interconnecting the emitter electrodes of said third and fourth transistors, and means for connecting the collector electrodes of said third and fourth transistors in series with said line.

References Cited in the file of this patent

UNITED STATES PATENTS

| | | |
|---|---|---|
| 2,569,345 | Shea | Sept. 25, 1951 |
| 2,655,609 | Shockley | Oct. 13, 1953 |
| 2,769,907 | Lohman | Nov. 6, 1956 |

UNITED STATES PATENT OFFICE

CERTIFICATE OF CORRECTION

Patent No. 2,907,895 October 6, 1959

Adrianus Johannes Wilhelmus Marie van Overbeek

It is hereby certified that error appears in the printed specification of the above numbered patent requiring correction and that the said Letters Patent should read as corrected below.

Column 4, line 66, for "said NPN transistor" read -- said PNP transistor --.

Signed and sealed this 29th day of March 1960.

(SEAL)

Attest:

KARL H. AXLINE

Attesting Officer

ROBERT C. WATSON

Commissioner of Patents

Notice of Adverse Decision in Interference

In Interference No. 93,243 involving Patent No. 2,907,895, A. J. W. M. van Overbeek, Transistor trigger circuit, final judgment adverse to the patentee was rendered Mar. 23, 1964, as to claim 3.

[*Official Gazette August 25, 1964.*]